March 18, 1958 G. L. KAMPA 2,827,255
MOUNTING MEANS FOR REAR VIEW MIRRORS
Filed May 9, 1955 2 Sheets-Sheet 1
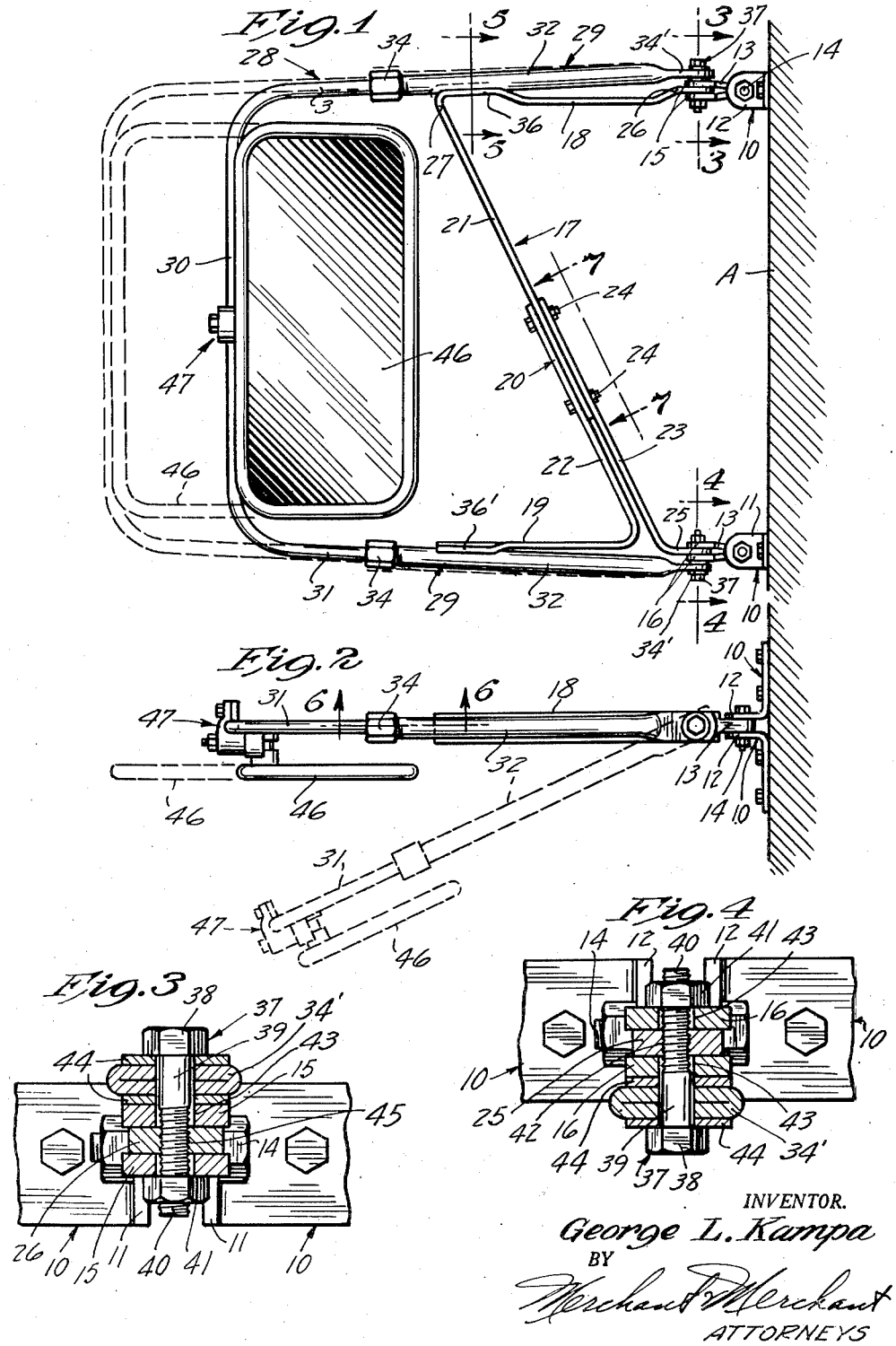
INVENTOR.
George L. Kampa
BY
Merchant & Merchant
ATTORNEYS March 18, 1958 G. L. KAMPA 2,827,255
MOUNTING MEANS FOR REAR VIEW MIRRORS
Filed May 9, 1955 2 Sheets-Sheet 2
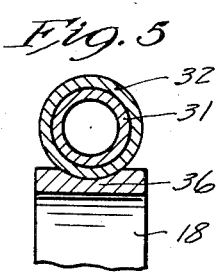
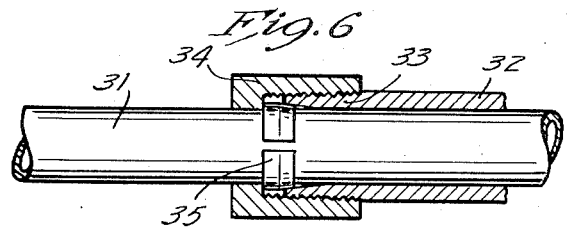
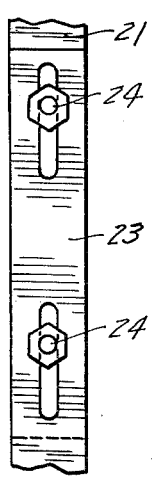
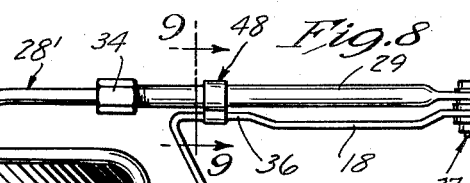
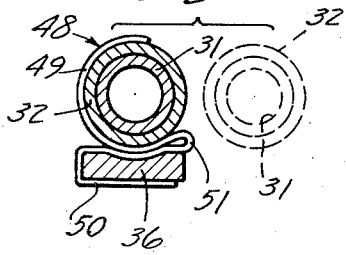
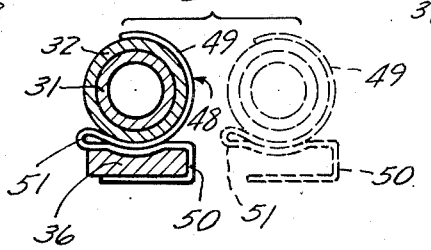
INVENTOR.
George L. Kampa
BY
Merchant & Merchant
ATTORNEYS

United States Patent Office 2,827,255
Patented Mar. 18, 1958

2,827,255

MOUNTING MEANS FOR REAR VIEW MIRRORS

George L. Kampa, Minneapolis, Minn.

Application May 9, 1955, Serial No. 506,996

5 Claims. (Cl. 248—285)

My invention relates to rear view mirrors for automotive vehicles, and more particularly to a novel mounting means therefor.

An object of my invention is to provide a novel mounting for rear view mirrors which permits a pivotal swinging movement of the mirror toward the vehicle which protects it from breakage or damage by engagement with an obstacle.

Another object of my invention is to provide a device of the class described wherein the mirror is releasably held in its normal operative position by sufficient holding force so that it won't swing from its normal position under the bumping or jarring occasioned by the vehicle traveling over a rough bumpy road or the like.

Another object of my invention is to provide a device of the class described with means for adjusting the holding force and for adjusting the position of the mirror laterally toward and away from the vehicle.

Another object of my invention is to provide a device of the class described with a novel and improved clip means for releasably holding the mirror in its normal operative position but permitting pivotal swinging movements therefrom in either direction upon application of sufficient force to release the clip means.

A further object of my invention is to provide a novel mounting means for rear view mirrors which is of simple construction, durable in use, and simply and effectively operative.

These and other objects and advantages of my invention will become apparent from the following specification and claims, reference being had to the accompanying drawings wherein:

Fig. 1 is a view in side elevation showing a rear view mirror and my invention attached to a vehicle;

Fig. 2 is a view in top plan of the structure shown in Fig. 1;

Figs. 3 and 4 are enlarged fragmentary views in vertical section taken on the lines 3—3 and 4—4 respectively, of Fig. 1;

Fig. 5 is an enlarged fragmentary view in vertical section taken on the line 5—5 of Fig. 1;

Fig. 6 is an enlarged fragmentary view partly in vertical section and partly in elevation taken substantially on the line 6—6 of Fig. 2;

Fig. 7 is an enlarged fragmentary view in plan taken substantially on the line 7—7 of Fig. 1;

Fig. 8 is a view in side elevation of a modification of my invention showing it attached to a vehicle;

Fig. 9 is an enlarged view partly in vertical section and partly in elevation taken on the line 9—9 of Fig. 8; and Fig. 10 is an enlarged view similar to Fig. 9 taken on the line 9—9 of Fig. 8 but with the clip shown therein in reverse position.

Referring more particularly to the drawings, wherein like characters will indicate like parts throughout the several views, I have shown one embodiment of my invention in Figs. 1–7 and a modification thereof in Figs. 8–10. Referring first to the embodiment of my invention illustrated in Figs. 1–7, I provide L-shaped mounting brackets 10. Two of the mounting brackets 10 are rigidly anchored to the cab body A of an automotive vehicle adjacent the driver's seat to provide a pair of outwardly projecting laterally spaced vertical flanges or lugs 11 in adjacent relationship; and two of the brackets 10 are rigidly secured to the cab A by bolts or the like, in vertically spaced relation to the aforementioned two brackets 10 to provide similarly disposed flanges or lugs, which will be indicated by the numeral 12, the pair of flanges or lugs 12 being upwardly spaced from the pair of flanges 11 in common vertical planes therewith. I provide a pair of U-shaped connecting members 13 each having its intermediate portion partially encompassing a nut-equipped bolt 14. One of the bolts 14 extends through horizontally aligned apertures formed in the flanges 11 to mount one of the connecting members 13 therebetween for limited pivotal movement about the horizontal axis defined by its associated bolt 14; and the other nut-equipped bolt 14 extends through horizontally aligned apertures formed in the flanges 12 to mount the other connecting member 13 between the flanges 12 for limited pivotal movements about the horizontal axis defined by its associated bolt 14. The connecting member 13 connected to flanges 12 defines a pair of generally vertically spaced horizontally disposed ears 15; and the other or lower connecting member 13 defines a pair of similar ears indicated by the numeral 16.

I provide an elongated generally Z-shaped fastening bar indicated in its entirety by the numeral 17. Fastening bar 17 defines a pair of vertically spaced horizontal portions 18 and 19, which are disposed in generally common vertical planes, and an intermediate diagonal portion 20. Preferably, fastening bar 17 is formed of three separate sections 21, 22 and 23 which overlap along a part of the intermediate portion 20. I provide means for releasably anchoring sections 21, 22 and 23 together for relative longitudinal movement in the direction of intermediate portion 20. Referring in particular to Figs. 1 and 7, this means preferably comprises longitudinally spaced slots formed in the overlapping portions of sections 21, 22 and 23 and nut-equipped bolts 24 each extending through one of the slots formed in each section. One end of section 23 defines a generally horizontally disposed lug, indicated by the numeral 25, which is disposed adjacent one end of intermediate portion 20 of fastening bar 17 and is disposed in vertical alignment with the free end 26 of horizontal portion 18. Horizontal portion 18 is a part of the integral section 21 which also defines a part of intermediate portion 20, including the end 27 thereof.

Lug 25 is rigidly secured to the connecting member 13 which defines flanges 16, and free end 26 of horizontal portion 18 is rigidly secured to the connecting member 13 which defines ears 15 by means which will be subsequently described.

I provide a U-shaped mounting rod, indicated in its entirety by the reference numeral 28, which has parallel arms 29, and a generally vertical intermediate portion 30 which connects the arms 29. Each of the arm portions 29 is comprised of telescopically engaged sections 31 and 32. Sections 31 are tubular arm sections integrally formed with intermediate portion 30 of mounting rod 28, and each telescopically fits into its associated tubular sleeve-forming arm section 32 for extending and retracting longitudinal movements with respect thereto. Arm sections 31 diverge outwardly from the intermediate portion 30 to their free ends so that retracting movements of arm sections 31 draw arm portions 29 together and extending movements of arm sections 31 spread the arm portions 29 slightly apart as indicated by dotted lines in Fig. 1. Referring in particular to Fig. 6, I provide means for releasably anchoring the sections 31 and 32 of each arm portion 29 in fixed relationship. The ends 33 of arm sections 32 are tapered and externally threaded to receive internally threaded sleeve-like nuts 34. A split beveled locking ring 35 encompasses each of the arm sections 31; and the tightening of each of the nuts 34 draws its associated beveled locking ring 35 between beveled end 33 and the associated arm section 31 to bind each of the associated arm sections 31 and 32 into locked fixed relationship. The loosening of nuts 34 permits relative longitudinal movement between each of the associated arm sections 31 and 32.

Ends 34' of arm sections 32, the free ends of arm portions 29, are flattened and are connected to connecting members 13, each to a different one for pivotal swinging movements about a generally vertical axis, by means which will be subsequently described in detail. Mounting rod 28 is connected to connecting members 13 to be disposed generally vertically with its parallel arm portions 29 disposed generally horizontally each extending laterally outwardly from a different one of the connecting members 13. Each of the arm portions 29 is normally positioned in contiguous generally parallel relationship with a different one of the parallel portions 18 and 19 of fastening bar 17. Preferably, upper arm portion 29 overlies parallel portion 18 and lower arm portion 29 underlies parallel portion 19.

Parallel portions 18 and 19 have grooved portions, indicated by the numerals 36 and 36' respectively, which define longitudinally extending outwardly opening arcuate grooves. Specifically and preferably, grooved portion 36 is formed in section 21 at the end of parallel portion 18 which connects with end 27 of intermediate portion 20; and grooved portion 36' is at the free end of parallel portion 19 of fastening bar 17. Grooved portions 36 and 36' are in generally vertical alignment, and they are adapted to embrace arm portions 29 of mounting rod 28, see Fig. 5, for releasably holding arm portions 29 at their normal positions, as shown in full lines in Fig. 2. The extension or retraction of intermediate portion 20, as aforementioned, permits an adjustment of the holding force of grooved portions 36 and 36' by moving the horizontal portions 18 and 19 toward or away from arm portions 29. Further, a spreading of the arms 29, resulting from an extension of arm sections 31 with respect to arm sections 32, may necessitate an extension of intermediate portion 20 to insure that grooved portions 36 and 36' embrace arm portions 29 with sufficient holding force so that mounting rod 28 won't swing from its normal position under the bumping or jarring occasioned by the vehicle traveling over a rough bumpy road or the like. If an adjustment of the longitudinal extension of intermediate portion 20 of fastening bar 17 is not sufficient to maintain mounting rod 28 at its normal position as desired, a small retraction of arm sections 31 with respect to arm sections 32 will draw the arm portions 29 together to bring them into tighter engagement with grooved portions 36 and 36'.

The means for connecting fastening bar 17 and mounting rod 28 to connecting members 13 is shown in detail in Figs. 3 and 4. Preferably, I provide a pair of generally vertically disposed axially aligned bolts 37 each comprising a head 38, a shank 39 and a threaded end 40. Each of the bolts 37 is provided with a nut 41. Lug 25 is disposed between the ears 16 and has a tapped aperture 42 vertically aligned with apertures 43 formed in the ears 16. One of the bolts 37 extends through apertures 42 and 43 and is in screw threaded engagement with the former. The ear 16 between lug 25 and nut 41 is forced into fixed frictional or locked engagement with lug 25 by nut 41. The flattened end 34' of one of the arm sections 32, and as specifically shown the lower one, is journalled between washers 44 between the other ear 16 and the head 38 on the shank 39 of bolt 37. The other bolt 37 similarly connects the flattened end 34' of the other arm section 32 and free end 26 to the other connecting member 13. The flattened end 34' of the upper arm section 32 is journalled between washers 44 on the shank 39 of bolt 37 between the head 38 and the upper one of the ears 15; and this bolt 37 is in screw threaded engagement with a tapped aperture 45 formed in free end 26. Tapped aperture 45 is in vertical alignment with the apertures formed in ears 15, which will be indicated by the numeral 43, the same numeral also identifying the apertures formed in ears 16. The lower ear 15 is forced into fixed frictional locked engagement with free end 26 between nut 41 and free end 26.

Framed mirror 46 is connected to intermediate portion 30 of mounting rod 28 by any suitable means, indicated generally by the numeral 47, wherein the mirror 46 is variously positioned to afford vision to the driver of the vehicle under varying circumstances. Mirror 46 is movable laterally toward and away from the cab A, as shown in full and dotted lines in Fig. 1, by longitudinal extension and retraction of the parallel arm portions 29, as aforementioned. Mirror 46 is also pivotally swingable with mounting rod 28, as shown in full and dotted lines in Fig. 2, whereby should the mirror 46 or mounting rod 28 hit an obstacle during movement of the vehicle, mounting rod 28 is pivotally swung about the axis defined by bolts 37 from its normal position inwardly toward the cab A until the mirror 46 may pass the obstacle. The driver may then easily swing the mounting rod 28 back to its normal position to releasably fix the mirror in its normal operative position.

Referring to Figs. 8–10, I have shown a modification of my invention, which structure makes use of many of the identical parts of the embodiment of my invention shown in Figs. 1–7. These identical parts will be indicated by the numerals used to identify the elements of the first embodiment of my invention; and the following description will be subsequently limited to the specific differences between these two embodiments of my invention. The principal distinction between the first-described modification of my invention and the modification shown in Figs. 8 through 10 is that, in the latter, I preferably provide a generally L-shaped mounting rod, indicated by the numeral 28', rather than the U-shaped mounting rod 28. Mirror 46 is connected to the depending vertically disposed portion 30' of mounting rod 28'. As the parallel arm portion of mounting rod 28' is identical to one of the parallel arm portions 29 of mounting rod 28, its parts will be indicated by the same numerals as used with respect to mounting rod 28.

The fastening bar of this modification of my invention will be indicated by the numeral 17'; however, it is to be noted that fastening bar 17' comprises the sections 21 and 23 shown in Fig. 1, and is the same as fastening bar 17 with the omission of section 22. Fastening bar 17' is substantially V-shaped with one elongated side, indicated by the numeral 20'. Elongated side or connecting link 20' is formed by the longitudinally extensible and retractable portions of sections 21 and 23.

The grooved portion 36 of horizontal portion 18 of fastening bar 17' is adapted to embrace or engage arm portion 29 of mounting rod 28', as explained with respect to the first-disclosed modification of my invention, for releasably holding mounting rod 28' in its normal position. However, in the second modification of my invention, I further provide a clip, indicated by the numeral 48, which is an aid in holding mounting rod 28' in its normal position so that it won't swing therefrom under severe bumping or jarring occasioned by the vehicle traveling over a very bumpy roadway or the like. Referring in particular to Figs. 9 and 10, clip 48 is substantially W-shaped and comprises a pair of side-by-side laterally opening loops 49 and 50, which are separated by the center portion of the clip indicated by the numeral 51. The overlapping portions of loops 49 and 50 forming clip portion 51 define a detent adapted to engage the grooved portion 36.

Arm 29 of mounting rod 23' is pivotally encompassed by the arcuate resilient loop 49 in releasable engaging relationship and resilient loop 50 is held in releasable engagement with grooved portion 36 of fastening bar 17' by the detent formed by clip portion 51, wherein the clip 48 may be positioned with the openings of loops 49 and 50 facing in either one direction or the opposite direction; and in either case, arm 29 is pivotally swingable in either direction from its normal position upon application of sufficient force to release clip 48 by either moving arm portion 29 out of engagement with loop 49, see Fig. 10, or by moving loop 50 in common with arm portion 29, out of engagement with grooved portion 36. Specifically, clip 48 may be positioned with the openings of the loops 49 and 50 facing in the direction as shown in Figs. 8 and 9 or in the opposite direction as shown in Fig. 10. When clip 48 is positioned as shown in Figs. 8 and 9, pivotal movement of mounting rod 28' in one direction, resulting from hitting an obstacle during forward movements of the vehicle, will cause the clip 48 to remain with mounting rod 28' and loop 50 is moved out of engagement with grooved portion 36, as shown in full and dotted lines in Fig. 9; pivotal movement of mounting rod 28' in the opposite direction would cause arm portion 29 thereof to move out of clipped relationship with loop 49 and clip 48 remains in engagement with grooved portion 36 of fastening bar 17' in the manner shown in Fig. 10. If clip 48 is reversed in position or disposed as shown in Fig. 10, the openings of loops 49 and 50 face in the opposite direction from that shown in Fig. 8. In this position of clip 48, pivotal movement of mounting rod 28' in the direction resulting from hitting an obstacle during forward movements of the vehicle will cause the arm portion 29 to be released from loop 49 as illustrated in Fig. 10; and similarly, pivotal movement in the opposite direction will cause clip 48 to move with arm 29 away from fastening bar 17' in the manner illustrated in Fig. 9.

It is an important feature of my invention that clip 48 releasably maintains mounting rod 28' in its normal position and yet be pivotally swingable in either direction therefrom upon application of a sufficient force occasioned by hitting an obstacle in either direction of movement of the vehicle. It is a further additional feature that upon pivotal swinging movements of the mounting rod 28' in either direction, clip 48 is maintained in engagement either with the fastening bar 17' or with arm portion 29. This maintains clip 48 in position so that mounting rod 28' and the mirror 46 may be easily swung back to and maintained at their normal operative positions upon passing the obstacle which effected pivotal swinging movements of the mirror 46.

It should also probably be noted that the pivotal mounting of connecting members 13 to brackets 10 maintains the parts of my invention in substantially proper alignment to insure against any undesirable binding effect. This is particularly true with respect to the first-disclosed modification of my invention, wherein either a spreading apart or a drawing together of the arm sections 32 of mounting rod 28 is effected by an extension or retraction of the diverging arm sections 31.

My invention has been built and tested and found to accomplish all of the afore-mentioned objectives and advantages. Although I have herein specifically disclosed two preferred embodiments of my invention, it will be obvious to those skilled in the art that my invention may be further modified by many substitutions and equivalents and that this disclosure is intended to be illustrative only. Therefore, I intend to be limited solely by the scope of the appended claims.

What I claim is:

1. A mount for rear view mirrors comprising a pair of connecting members adapted to be connected to a vehicle in generally vertically spaced relationship each defining a generally horizontally disposed ear, a fastening bar fixedly connected to said ears and comprising a pair of vertically spaced horizontal portions disposed in common vertical planes each extending generally laterally outwardly from a different one of said ears and an intermediate portion extending between and connecting said horizontal portions, said horizontal portions each having a grooved portion with an outwardly opening groove formed therein, and a generally vertically disposed U-shaped mounting rod having its parallel arms normally positioned each in contiguous generally parallel relationship with a different one of the parallel portions of said fastening bar with the upper arm portion overlying the upper parallel portion of said bar and the lower arm portion underlying the lower parallel portion of said bar, the free ends of said arm portions being pivotally connected each to a different one of said ears for pivotal swinging movements about a generally vertical axis, said grooved portions of said bar being adapted to embrace said arm portions at the normal position of said mounting rod for releasably holding said mounting rod at its normal position.

2. The structure defined in claim 1 in which the intermediate portion of said fastening bar comprises relatively longitudinally movable overlapping sections which may be extended or retracted for moving the horizontal portions of said fastening bar toward or away from the adjoining arm portions, and in further combination with means releasably anchoring said overlapping sections in fixed relationship.

3. The structure defined in claim 2 in which said arm portions each comprise telescopically engaged sections relatively longitudinally movable to extend and retract said arm portions, and in further combination with means for releasably anchoring the sections of each arm portion in fixed relationship.

4. A mount for rear view mirrors comprising a pair of vertically spaced U-shaped connecting members each defining a pair of generally vertically spaced horizontally disposed ears, said connecting members being connected to a vehicle for limited pivotal movements about vertically spaced horizontal axes which are generally parallel to the side of the vehicle, a generally Z-shaped fastening bar disposed generally vertically with its parallel portions disposed generally horizontally at right angles to said axes, a horizontally disposed lug rigid with said fastening bar adjacent one end of the intermediate diagonal portion thereof and disposed in generally vertical alignment with the free end of the parallel portion which is connected to the opposite end of said intermediate portion, said parallel portions of the fastening bar each having a grooved portion with an outwardly opening groove formed therein, a generally vertically disposed U-shaped mounting rod having its parallel arms normally positioned each in contiguous generally parallel relationship with a different one of the parallel portions of said fastening bar with the upper arm portion overlying the upper parallel portion of said bar and the lower arm portion underlying the lower parallel portion of said bar, the free ends of said arm portions being pivotally connected each to a different one of said connecting members for pivotal swinging movements about a generally vertical axis, the intermediate portion of said bar comprising relatively longitudinally movable overlapping sections which may be extended or retracted for moving the horizontal portions of said fastening bar toward or away from their adjoining arm portions, said grooved portions of said bar embracing said arm portions at the normal position of said mounting rod for releasably holding said mounting rod at its normal position, and means connecting the free ends of said arm portions to said connecting members for said pivotal movement and connecting said lug and said free end vertically aligned therewith rigidly to said connecting members.

5. The structure defined in claim 4 in which said lastmentioned means comprises a pair of generally vertically disposed axially aligned nut-equipped bolts each comprising a head and a threaded end and a shank between the head and threaded end thereof, said lug and the free end of said bar vertically aligned therewith being disposed each between the ears of a different one of said connecting members and each having a tapped aperture vertically aligned with apertures formed in the ears adjacent therewith, said tapped apertures each receiving a different one of said bolts in screw threaded engagement, the nuts of said bolts forcing one of the ears of one connecting member into fixed frictional locking engagement with the adjoining lug and one of the ears of the other connecting member into similar engagement with the adjoining free end of said bar, and the free ends of said arm portions being journalled one on the shank of each bolt between the head thereof and the other ear of each connecting member.

References Cited in the file of this patent
UNITED STATES PATENTS

| | | |
|---|---|---|
| 1,187,325 | Ivey | June 13, 1916 |
| 1,675,931 | Gullete | July 3, 1928 |
| 1,814,342 | Smith | July 14, 1931 |
| 1,921,310 | Crisman | Aug. 8, 1933 |
| 2,319,557 | Ritz-Woller | May 18, 1943 |
| 2,565,012 | Barrett | Aug. 21, 1951 |
| 2,708,086 | Prutzman | May 10, 1955 |